US005985431A

United States Patent [19]
Oosedo et al.

[11] Patent Number: 5,985,431
[45] Date of Patent: Nov. 16, 1999

[54] PREPREG, AND A FIBER REINFORCED COMPOSITE MATERIAL

[75] Inventors: Hiroki Oosedo; Atsushi Ozaki, both of Ehime; Hideo Nagata, Shiga, all of Japan

[73] Assignee: Toray Industries, Inc., Tokyo, Japan

[21] Appl. No.: 08/682,761

[22] PCT Filed: Dec. 4, 1995

[86] PCT No.: PCT/JP95/02474

§ 371 Date: Dec. 10, 1996

§ 102(e) Date: Dec. 10, 1996

[87] PCT Pub. No.: WO96/17006

PCT Pub. Date: Jun. 6, 1996

[30] Foreign Application Priority Data

Dec. 2, 1994 [JP] Japan ................................. 6-329588

[51] Int. Cl.$^6$ .............................. B32B 27/04; B32B 5/16; B32B 27/38

[52] U.S. Cl. ...................... 428/297.4; 428/323; 428/327; 428/413; 428/473.5; 428/474.4; 428/474.7; 428/480; 428/524

[58] Field of Search ................................ 428/297.4, 323, 428/327, 413, 414, 473.5, 474.7, 474.4, 480, 524

[56] References Cited

U.S. PATENT DOCUMENTS

| 3,472,730 | 10/1969 | Frigstad | 161/144 |
|---|---|---|---|
| 4,517,321 | 5/1985 | Gardner et al. | 523/400 |
| 4,579,885 | 4/1986 | Domeier et al. | 523/400 |
| 4,604,319 | 8/1986 | Evans et al. | 428/290 |
| 4,661,559 | 4/1987 | Gardner et al. | 525/65 |
| 4,863,787 | 9/1989 | Gawin | 428/240 |
| 4,868,050 | 9/1989 | Tanaka et al. | 428/335 |
| 4,874,661 | 10/1989 | Browne et al. | 428/246 |
| 4,908,088 | 3/1990 | Boyd et al. | 156/307 |
| 4,954,195 | 9/1990 | Turpin | 156/242 |
| 4,956,411 | 9/1990 | Tada et al. | 528/93 |
| 4,992,325 | 2/1991 | Kim et al. | 428/241 |
| 5,025,045 | 6/1991 | Gawin et al. | 523/440 |
| 5,028,478 | 7/1991 | Odagiri et al. | 428/283 |
| 5,037,689 | 8/1991 | Boyd | 428/113 |
| 5,057,353 | 10/1991 | Maranci et al. | 428/147 |
| 5,087,657 | 2/1992 | Qureshi et al. | 524/508 |
| 5,169,710 | 12/1992 | Qureshi et al. | 428/246 |
| 5,242,748 | 9/1993 | Folda et al. | 428/272 |
| 5,248,711 | 9/1993 | Buyny et al. | 523/500 |
| 5,334,662 | 8/1994 | Ochi et al. | 525/90 |

FOREIGN PATENT DOCUMENTS

| 0351025 | 1/1990 | European Pat. Off. . |
|---|---|---|
| 0351026 | 1/1990 | European Pat. Off. . |
| 0351027 | 1/1990 | European Pat. Off. . |
| 0351028 | 1/1990 | European Pat. Off. . |
| 0486044 | 5/1990 | European Pat. Off. . |
| 95-78138 | 12/1986 | Japan . |
| 62-29316 | 12/1987 | Japan . |
| 62-297312 | 12/1987 | Japan . |
| 01-104624 | 4/1989 | Japan . |
| 7-78138 | 8/1995 | Japan . |
| 1 299 177 | 12/1972 | United Kingdom . |

*Primary Examiner*—Paul Thibodeau
*Assistant Examiner*—Holly C. Rickman
*Attorney, Agent, or Firm*—Morrison & Foerster LLP

[57] ABSTRACT

A prepreg comprising (a) reinforcing fibers and (b) a matrix resin which comprises specific epoxy resin composition, a curing agent with a specific structure and a highly heat resistant thermoplastic resin, the cured product of which has a low water absorption. An interlayer toughened prepreg containing reinforcing fibers and a matrix resin comprising a specific epoxy resin composition, a hardening agent with a specific structure and a highly heat resistant thermoplastic resin is also provided. In addition, a cured product can be obtained by curing any of the above prepregs, which product satisfies both impact resistance (residual compressive strength after impact) and heat and wet property (compressive strength of notched coupon at high temperature and high humidity) at high levels, even though these properties have been in contradictory relation in the conventional techniques.

25 Claims, No Drawings

PREPREG, AND A FIBER REINFORCED COMPOSITE MATERIAL

TECHNICAL FIELD

The present invention relates to a prepreg used for forming a fiber reinforced composite material, and a fiber reinforced composite material produced by forming the prepreg. In more detail, the present invention relates to a prepreg used for forming a fiber reinforced material excellent in compressive mechanical properties and suitable as a structural material, and a fiber reinforced composite material produced by forming the prepreg.

BACKGROUND ART

Polymer based composite materials consisting of reinforcing fibers and a matrix resin are widely used for sporting goods, aerospace, general industries, etc. Fiber reinforced composite materials are produced by various methods, and among the methods, it is widely practiced to use intermediate sheets, in which reinforcing fibers are impregnated with an unhardened matrix resin, as a prepreg. In this method, usually, sheets of a prepreg are laminated and heated, to form a composite material. The matrix resins used for prepregs include both thermosetting resins and thermoplastic resins, and in most cases, thermosetting resins excellent in handling convenience are used. Above all, epoxy resins are used most frequently. Furthermore, maleimide resins, cyanate resins, and their combinations are also often used.

In general, polymer based materials decline in strength and elastic modulus at high temperature and/or high humidity. Therefore, fiber reinforced composite materials using a polymer as a matrix are also likely to decline in physical properties such as strength at high temperature or high humidity. However, the composite materials used as structural materials of airplanes, vehicles, ships, etc. are required to keep physical properties sufficiently even at high temperature and/or high humidity. When a fiber reinforced composite material is used as a structural material, compressive strength is an especially important physical property. The compressive strength can be measured by using a unnotched coupon, notched coupon or cylinder, etc. as a test piece, but in actual use, since the fiber reinforced composite material is often used as a plate with bolt holes, the compressive strength of a notched coupon especially at high temperature and at high humidity is important.

However, conventional polymer based composite materials are not always sufficient in the compressive strength at high temperature or high humidity even though they are advantageously light in weight. So, they are sometimes limited in applicability. To enhance the compressive strength at high temperature and high humidity, it is effective to enhance the elastic modulus of the resin, and it is considered important to prevent the decline of elastic modulus at high temperature and high humidity. For enhancing the elastic modulus of the resin, it has been proposed to use epoxy resins higher in crosslinking density, and for preventing the decline of elastic modulus at high temperature and high humidity, it has been proposed to decrease the percentage of water absorption and to introduce a heat resistant skeleton. As resin compositions for prepregs balanced in impact resistance, heat resistance and water resistance, Japanese Patent Laid-Open Nos. 62-297316 and 62-297312 disclose resin compositions consisting of an epoxy resin composition mainly composed of an epoxy resin with triglycidylaminophenol skeleton, and diaminodiphenylsulfone (DDS), polyether sulfone (PES) or polyether imide (PEI).

However, their heat resistance is evaluated in reference to glass transition temperature, and water resistance, to the percentage of water absorption, respectively separately, and the problem that an epoxy resin with triglycidylaminophenol skeleton declines greatly in physical properties at high temperature and high humidity is not solved at all. Furthermore, to prevent the decline of hardened epoxy resins in physical properties caused by moisture absorption, less hygroscopic diamine hardening agents and their epoxy resin compositions are disclosed in Japanese Patent Laid-Open Nos. 59-215314, 59-215315 and 60-67526. It is disclosed that if any of the special diamine hardening agents is used, the hardened epoxy resin composition keeps high physical properties even at high temperature and high humidity, and has high impact resistance as a non-interlayer toughened prepreg.

However, if an actual application as a prepreg is considered, the amount of the special curing agent added to the epoxy resin must be larger than the amounts of the conventional curing agents, to obtain sufficient physical properties, since the special curing agent is large in molecular weight compared with the number of reaction points (the number of amine hydrogen atoms). For this reason, the viscosity of the composition becomes high, and as a result, the degree of freedom in resin formulation is significantly limited. For example, if it is attempted to enhance impact resistance by adding a thermoplastic resin or using an interlayer toughening technology for meeting the demand for higher impact resistance, the viscosity of the resin increases. So, the application of such a technology is considered to be practically impossible, and it is difficult to enhance the impact resistance higher than the disclosed level.

As a resin composition excellent in heat resistance and flow property during resin curing, Japanese Patent Publication No. 7-78138 describes to combine 3,3'-DDS and a thermoplastic resin of 100° C. or higher in Tg with epoxy resins, and also states that if heat resistance is especially important, it is preferable to let the content of tetraglycidyl-diaminodiphenylmethane (TGDDM) account for 50 to 80% of all the epoxy resins. The main effect found by that invention is that if 3,3'-DDS high in the solubility in epoxy resins and high in reactivity is used instead of 4,4'-DDS, the reaction with the epoxy resins during heating for curing can be expedited to allow the minimum viscosity to be kept high. If an epoxy resin is cured by using 3,3'-DDS like this, the cured resin can be high in heat resistance, but on the other hand, the toughness of the resin decreases, to also decrease impact resistance. The above invention does not solve this problem at all.

As a prepreg excellent in impact resistance, Japanese Patent Publication No. 6-94515 discloses a particulate interlayer toughening technology of adding fine thermoplastic resin particles to a thermosetting resin used as a base resin. An example described in the patent gazette discloses a composition containing TGDDM by 90% in the epoxy resins as a thermosetting resin used as a base resin, 4,4'-DDS by 0.175 time the mole number of epoxy groups, and 10% of PES as a thermoplastic resin. The invention disclosed above is mainly intended to provide a technology for enhancing the toughness of a laminate selectively at its interlayer regions where stresses are concentrated most under impact, by adding a thermoplastic resin. The invention discloses a technology concerned with impact resistance, but does not solve anything about improvement of compressive strength. Japanese Patent Laid-Open Nos. 5-1159 and 4-268361 also disclose interlayer toughening technology, and describes cases of using an epoxy resin consisting of TGDDM and triglycidylaminophenol as a base resin, 3,3'-DDS as a curing agent, and a polysulfone or a PES oligomer with amine terminals as a thermoplastic resin. These inventions are also mainly intended to improve impact resistance by interlayer toughening. These resin compositions are improved in impact resistance as disclosed in the examples, but since triglycidylaminophenol used accounts for 40 to 50% of all the epoxy resins, the elastic modulus of the resin at high temperature and high humidity is not so high, and hence the compression property at high temperature and high humidity is not sufficient either.

DISCLOSURE OF THE INVENTION

The inventors found that a prepreg using a matrix resin containing a specific epoxy resin composition, specific curing agent and specific thermoplastic resin can provide a fiber reinforced composite material preferable as a structural material excellent in compressive mechanical properties, especially in the compressive strength as a notched coupon at high temperature and high humidity.

The first version of the present invention is a prepreg which contains reinforcing fibers and a matrix resin, comprising at least (A) an epoxy resin composition,
(B) a diamine compound having 1 to 3 phenyl groups in the skeleton, at least one of which has bonded groups each connected to two amino groups, bonded at meta positions, and
(C) a thermoplastic resin of 180° C. or higher in glass transition temperature, to constitute said matrix resin, wherein 70 wt % or more of said epoxy resin composition (A) is at least one epoxy resin or more epoxy resins as a mixture selected from a group consisting of the following (A1) to (A3), and even if the prepreg is cured and immersed in 71° C. water for 2 weeks, the percentage of water absorption is 1% or less;

(A1) an epoxy resin having a plurality of diglycidylamino groups directly bonded with a non-condensed benzene ring respectively
(A2) an epoxy resin having a condensed aromatic ring in the skeleton
(A3) a glycidyl ether type epoxy resin represented by the following general formula (1)

where a represents 1 or 2, and

R1 to R5 represent, respectively independently, a hydrogen atom, halogen atom, or alkyl group having 4 or less carbon atoms.

The second version of the present invention is a prepreg which contains reinforcing fibers and amatrix resin, comprising at least (A) an epoxy resin composition,
(B) a diamine compound having 1 to 3 phenyl groups in the skeleton, at least one of which has bonded groups each connected to two amino groups, bonded at meta positions,
(C) a thermoplastic resin of 180° C. or higher in glass transition temperature, and
(D) a film, particles, fibers or their combination of a thermoplastic resin, to constitute said matrix resin, wherein 70 wt % or more of said epoxy resin composition (A) is at least one epoxy resin or more epoxy resins as a mixture selected from a group consisting of the following (A1) to (A3), and the thermoplastic resin (D) is arranged on one side or both sides of the prepreg;

(A1) an epoxy resin having a plurality of diglycidylamino groups directly bonded with a non-condensed benzene ring respectively (A2) an epoxy resin having a condensed aromatic ring in the skeleton (A3) a glycidyl ether type epoxy resin represented by the following general formula (1)

General formula (1)

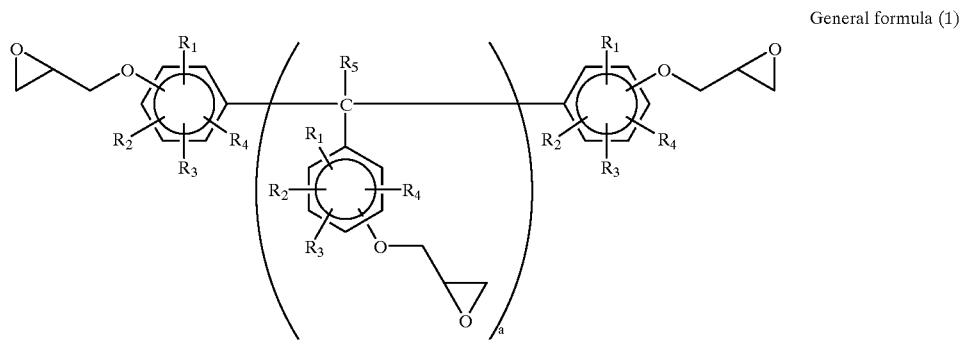

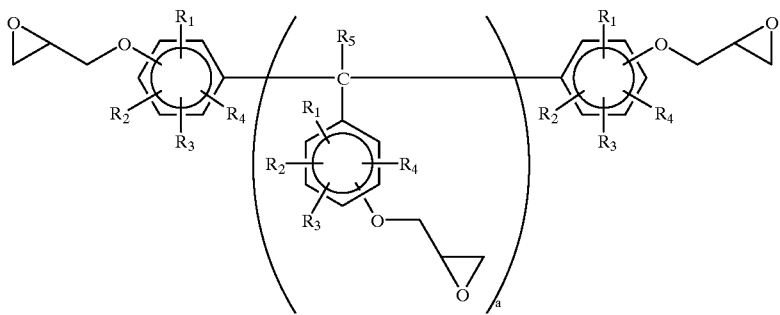

General formula (1)

where a represents 1 or 2, and

R1 to R5 represent, respectively independently, a hydrogen atom, halogen atom, or alkyl group having 4 or less carbon atoms. The third version of the present invention is a prepreg which contains reinforcing fibers and a matrix resin, comprising at least (A) an epoxy resin composition,
(B) a diamine compound having 1 to 3 phenyl groups in the skeleton, at least one of which has bonded groups each connected to two amino groups, bonded at meta positions,
(C) a thermoplastic resin of 180° C. or higher in glass transition temperature, and
(D) a film, particles, fibers or their combination of a thermoplastic resin, to constitute said matrix resin, wherein 70 wt % or more of said epoxy resin composition (A) is at least one epoxy resin or more epoxy resins as a mixture selected from a group consisting of the following (A1) to (A3); the thermoplastic resin (D) is arranged on one side or both sides of the prepreg; and even if the prepreg is cured and immersed in 71° C. water for 2 weeks, the percentage of water absorption is 1% or less;

(A1) an epoxy resin having a plurality of diglycidylamino groups directly bonded with a non-condensed benzene ring respectively (A2) an epoxy resin having a condensed aromatic ring in the skeleton (A3) a glycidyl ether type epoxy resin represented by the following general formula (1)

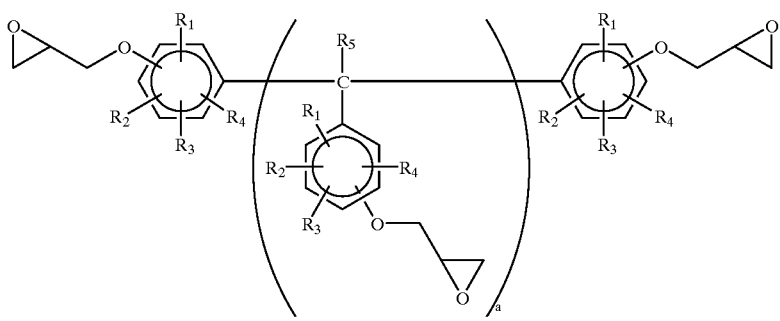

General formula (1)

(where a represents 1 or 2).

BEST MODE FOR CARRYING OUT THE INVENTION

The epoxy resin (A1) having two diglycidylamino groups directly bonded with a non-condensed benzene ring respectively, which can be used in the present invention, is an epoxy resin which can be cured into a product high in heat resistance and elastic modulus since the cured product is high in crosslinking density, and any of the epoxy resins represented by the following general formula (2) is preferable since it is high in heat resistance:

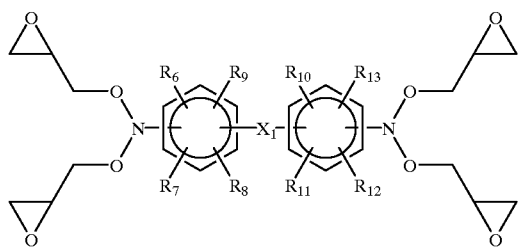

Formula (2)

where R6 to R13 represent, respectively independently, a hydrogen atom, halogen atom or alkyl group having 4 or less carbon atoms; and X1 represents —CO—, —S—, —SO2—, —O—, or divalent combined groups represented by any one of the following general formulae (3) to (4);

Formula (3)

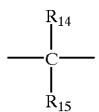

where R14 and R15 represent, respectively independently, a hydrogen atom or alkyl group having 4 or less carbon atoms Formula (4)

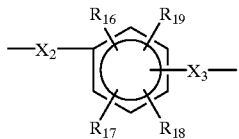

where R16 to R19 represent, respectively independently, a hydrogen atom, halogen atom or alkyl group having 4 or less carbon atoms; and
X2 and X3 represent, respectively independently, —CO—, —S—, —SO2—, —O—, or divalent combined groups represented by the following general formula (5);

Formula (5)

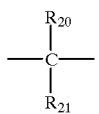

where R20 and R21 represent, respectively independently, a hydrogen atom or alkyl group having 4 or less carbon atoms. Preferable examples of said R6 to R21 include hydrogen atom, chlorine atom, bromine atom, methyl group, ethyl group, and isopropyl group.

Preferable examples of the epoxy resin (A1) include those represented by the following general formulae (6) and (7);

Formula (6)

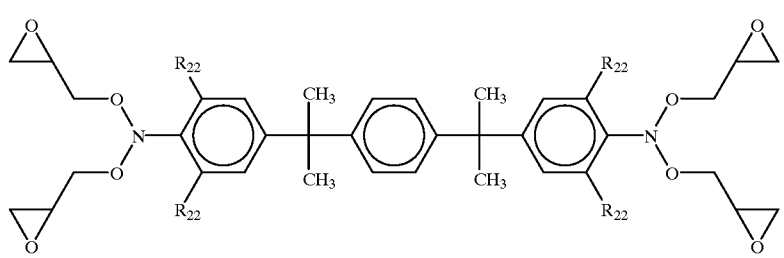

R22 represents a hydrogen atom or methyl group.

Formula (7)

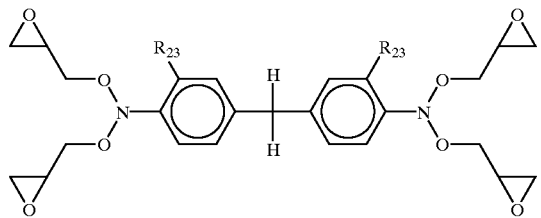

R23 represents a hydrogen atom or ethyl group.

The epoxy resin with a condensed aromatic ring in the skeleton (A2) has at least one condensed aromatic ring such as naphthalene, phenanthrene, anthracene, pyrene, coronene or fluorene in the skeleton, and two or more glycidyl groups, and since it has a bulky structure in the skeleton, it can form a rigid cured structure, to preferably provide a cured product high in heat resistance and elastic modulus.

Above all, those represented by the following general formulae (8) to (10) are preferable in view of heat resistance.

Formula (8)

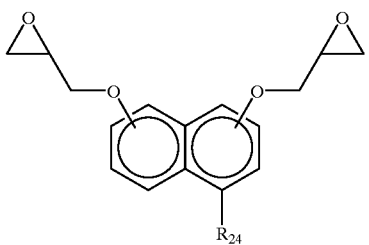

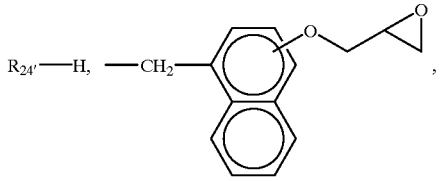

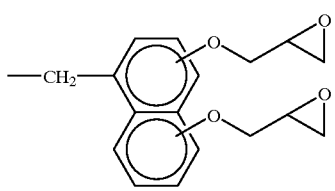

-continued

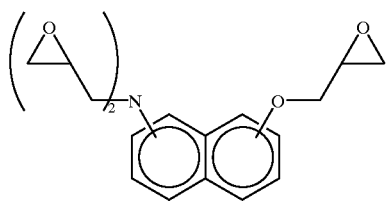
Formula (9)

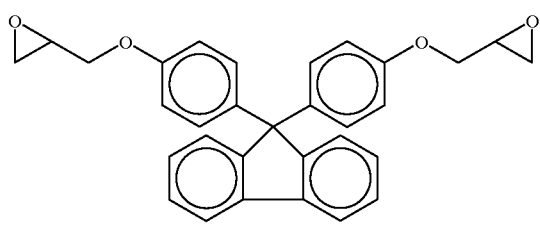
Formula (10)

The epoxy resin represented by said general formula (1) (A3) has 3 or 4 epoxy groups in the molecule and is effective in enhancing the crosslinking density and heat resistance of the cured product.

4,4'-methylenebisbenzeneamine) is used as an ingredient by more than 80 wt % in the epoxy resin composition, (a compound with a plurality of epoxy groups in any optional molecule can be used,) to provide a resin high in elastic modulus at room temperature, and less in the decline of the elastic modulus at high temperature and high humidity. The remaining ingredient can be selected, for example, from bisphenol A type epoxy resins, bisphenol F type epoxy resins, bisphenol S type epoxy resins, bisphenol B type epoxy resins, novolak type epoxy resins, epoxy resins produced from a copolymer of a phenol compound and dicyclopentadiene, glycidyl ether type epoxy resins such as resorcinol diglycidylether, glycidylamine type epoxy resins such as tetraglycidylxylenediamine, and their combinations. The remaining ingredient can be properly selected to suit respective objects. For example, to increase the amount of the thermoplastic resin to be added, an epoxy resin low in viscosity can be used as the remaining ingredient, or to adjust the viscosity level for handling convenience or for resin fluidity at the curing process, an epoxy resin high in viscosity can be used. Above all, a composition consisting of more than 80 wt % of a tetraglycidyldiaminodiphenylmethane and a bi-functional epoxy resin, especially a composition consisting of N,N,N',N'-tetraglyci dyl-4,4'-

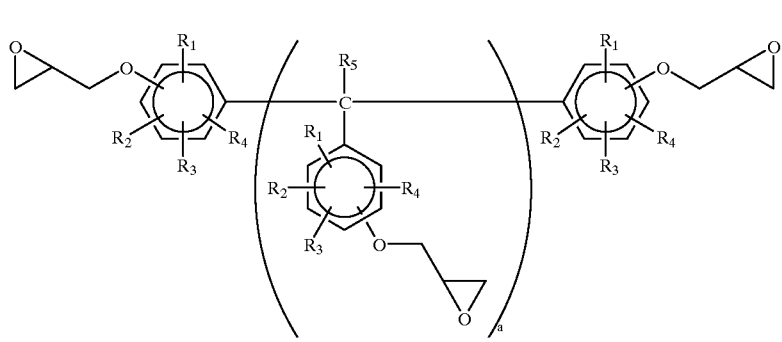
General formula (1)

where a represents 1 or 2, and

R1 to R5 represent, respectively independently, a hydrogen atom, halogen atom or alkyl group having 4 or less carbon atoms.

As the epoxy resin (A3), tris(4-glycidyloxyphenyl) methane and 1,1,2,2-tetrakis(4-glycidyloxyphenyl)ethane are preferable in view of heat resistance.

For the epoxy resin composition, an epoxy resin with a specific chemical structure as described above is used as a main ingredient, and as far as 70 wt % or more of the epoxy resin composition (A) is at least one epoxy resin or more epoxy resins as a mixture selected from the group consisting of said (A1), (A2) and (A3), the remaining ingredient is not especially limited. If tetraglycidyldiaminodiphenylmethane (TGDDM) type epoxy resin (e.g., N,N,N',N'-tetraglycidylmethylenebisbenzeneamine and a bisphenol F type resin, or bisphenol A type epoxy resin, or resorcinol diglycidylether is preferable in view of good handling convenience and a large degree of freedom in the control of physical properties by the addition of the thermoplastic resin.

The matrix resin of the prepreg of the present invention contains, as a curing agent of the epoxy resin composition, a diamine compound (B) having 1 to 3 phenyl groups in the skeleton, at least one of which has bonded groups each connected to two amino groups, bonded at meta positions. Above all, a diamine compound with a structure represented by the following general formula (11) is preferably effective for enhancing the elastic modulus of the resin and decreasing the percentage of water absorption.

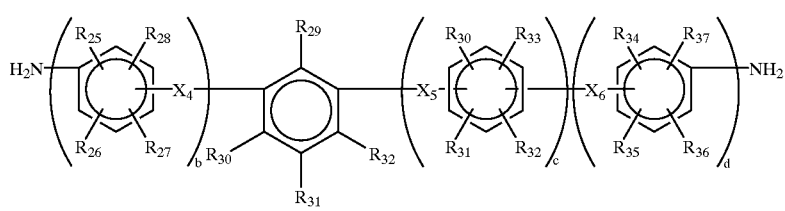

Formula (11)

where b, c, and d represent, respectively independently, 0 or 1, subject to b+c+d<3, R25 to R37 represent, respectively independently, a hydrogen atom, halogen atom or alkyl group having 4 or less carbon atoms, and X4 to X6 represent, respectively independently, —CO—, —S—, —SO2— —O— or divalent combined group represented by the following general formula (12):

Formula (12)

where R38 and R39 represent, respectively independently, a hydrogen atom, halogen atom or alkyl group having 4 or less carbon atoms.

In view of handling life of the prepreg, it is preferable that the diamine compound (B) is not 0 in b+c+d. In the case of b+c+d=0, the working life is short practically disadvantageously since the reactivity with epoxy groups is high. Furthermore, it is preferable that two benzene rings are contained in one molecule like b=1 and c=d=0. The reason is that less benzene rings raise the crosslinking density, being likely to enhance the heat resistance.

The handling life in this case refers to the time during which the prepreg can be used without being greatly decreased in handling convenience represented by the tackiness and drapability of the prepreg, compared to its initial state. Since the prepreg contains the diamine compound reactive with the epoxy resins in the epoxy resin composition, reaction progresses during storage (or during use) even though gradually, to increase the viscosity of the epoxy resin composition. Since the viscosity of the epoxy resin composition affects the tackiness and drapability of the prepreg, there is a limit to the time (days) during which the prepreg can be used. The tackiness and drapability of a prepreg is often evaluated in reference to touch feeling, and there is no quantitative standard established. However, as a simple evaluation method, the glass transition temperature of an uncured prepreg is measured by DSC. In this case, it is said that a prepreg relatively small in the change of the glass transition temperature is relatively preferable.

Preferable examples of the diamine compound (B) include 3,4'-diaminodiphenylsulfone, 3,3'-diaminodiphenylsulfone, 3,4'-diaminodiphenylmethane, 3,3'-diaminodiphenylmethane, 3,4'-diaminodiphenyl ether and their alkyl substituted derivatives. If any one of them is used, the epoxy resin composition can be cured by a less amount of the diamine compound (B).

Above all, 3,4'-diaminodiphenylsulfone and 3,3'-diaminodiphenylsulfone can be more preferably used since the handling life is especially long. These diamine compounds with —SO2— have an advantage that the working life is long since the reactivity of amino groups with epoxy groups is weakened by the electrophilic effect of SO2. Of them, 3,3'-diaminodiphenylsulfone is preferable because the amount added can be small, because the working life is long, and because the effect of enhancing the compressive strength at high temperature and high humidity can be exhibited most remarkably due to the two meta substituted phenyl groups in the molecule.

To add the diamine compound, the diamine compound can be dissolved homogeneously into the epoxy resin composition using a solvent, or the diamine compound can be kneaded with and dispersed into the epoxy resin composition, without using any solvent. The latter method of addition is preferable, since dispersion can advantageously make the handling life longer than dissolution. In the coating of the resin film or impregnation into carbon fibers in the production of a prepreg, if there are large particles, they cause blocking between the rolls of the coating machine or do not allow impregnation between carbon fibers. So, it is preferable that 90 wt % or more of the diamine compound is 40 µm or less in particle diameter.

The reaction between the diamine compound and the epoxy resin composition in the prepreg during storage progresses near the interfaces between the diamine compound particles and the epoxy resin composition. For this reason, if the surface area of the diamine compound particles is smaller, the contact area with the epoxy resin is less to make the handling life longer. When there are particles with a certain volume, the smaller the particles, the larger the surface area. Therefore, to achieve a preferable handling life by keeping the surface area small at a certain level, it is preferable that particles of 1 µm or less in particle diameter account for 1 wt % or less of the diamine compound. Especially a diamine compound of 15 µm or less in the median particle diameter of the particle diameter distribution and 2.0 or less in the σg calculated from [(Mean particle diameter+Standard deviation)/(Mean particle diameter)] is especially preferable since the prepreg is excellent both in processability and handling life.

A composition in which the active hydrogen atoms of amino groups of the diamino compound react with the epoxy groups of the epoxy resin composition at 1:1 is a composition in which the mole number of the diamine in the matrix resin is 0.25 time the mole number of the epoxy groups in the epoxy resin composition. However, a composition suitable for obtaining excellent compressive strength is different from this composition, and is a composition in which the mole number of 3,3'-diaminodiphenylsulfone in the matrix resin is 0.15 to 0.2 time the mole number of the epoxy groups in the epoxy resin composition.

The matrix resin of the prepreg of the present invention contains one or more thermoplastic resins (C) in view of impact resistance. The thermoplastic resin used in the present invention is 180° C. or higher, preferably 200° C. or higher, more preferably 215° C. or higher in Tg, in view of heat resistance. The thermoplastic resin (C) is preferably soluble in the epoxy resin composition. That the thermoplastic resin is soluble in the epoxy resin composition means that there is a temperature range in which the epoxy resin composition containing the thermoplastic resin forms a homogeneous phase. The phase separation of the resin composition at room temperature or the phase separation in the curing process of the resin composition is allowable. Examples of the thermoplastic resin include polysulfones, polyimides, polyketones, aromatic polyesters, etc., and above all, the polysulfones and polyimides represented by the following general formulae (13) and (14) are preferable since they are high in heat resistance and toughness.

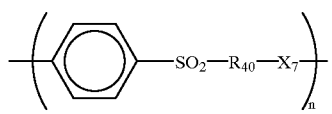

Formula (13)

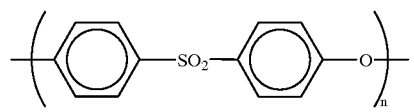

Formula (14)

where n represents a numeral of 5 to 100; X7 represents —CO—, —S—, —SO2— or —O—; and R40 represents either of the structures represented by the following formulae:

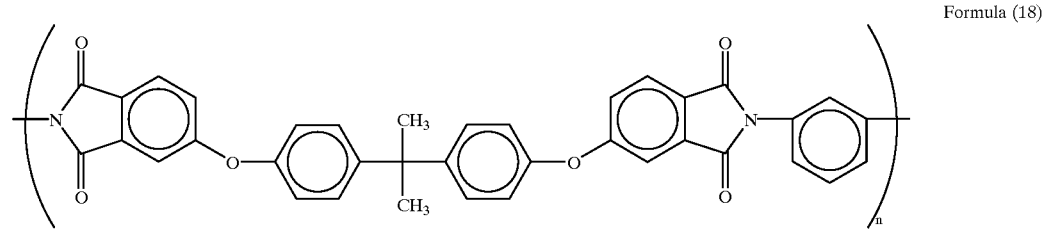

where n represents a numeral of 5 to 100; X8 represents a direct bond, —CO—, —S—, —SO2—, —O— or divalent combined group represented by the following general formula (15); and R41 represents a structure represented by the following general formula (16);

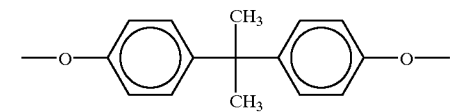

Formula (15)

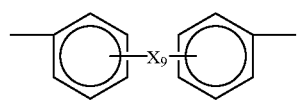

Formula (16)

where X9 represents a direct bond, —CO—, —S—, —SO2 or —O—. Furthermore, in view of the solubility in the epoxy resin composition, it is more preferable that the skeleton has an ether bond. The most preferable thermoplastic resins satisfying this condition have any of the structures represented by the following formulae (17) and (18).

Formula (17)

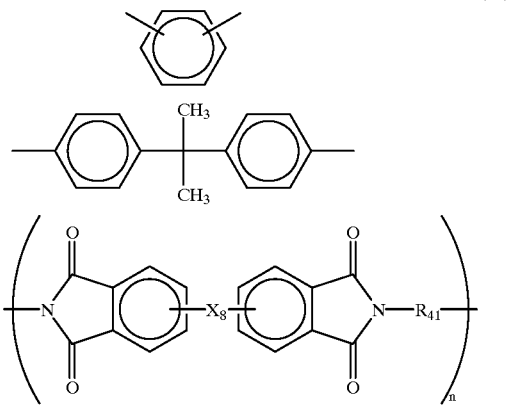

Formula (18)

where n represents a numeral of 5 to 100.

The thermoplastic resin (C) is preferably about 2000 to 25000 in number average molecular weight. If the molecular weight is smaller than it, the effect of enhancing toughness is small. If the molecular weight is larger than it, the viscosity of the resin increases remarkably, to lower the workability in the production of the prepreg, and to remarkably decrease the handling convenience represented by the tackiness and drapability of the prepreg. The thermoplastic resin (C) is preferably contained by 1 to 15 wt % based on the weight of the epoxy resin composition. If the content is less than 1%, the fluidity during forming and curing may be too high, and if more than 15%, the viscosity as a solution with the epoxy resin may be so high as to decrease the handling convenience represented by the tackiness and drapability of the prepreg. For the balance between the fluidity of the resin and the tackiness and drapability of the prepreg, it is preferable that the content is 1 to 10 wt %. To enhance the toughness of the cured product, the content is required to be large to some extent, and for this reason, a more preferable range is 5 to 10 wt %.

If the phase rich in the thermoplastic resin is separated in the curing process due to insufficient bonding between the phases, the toughness of the resin cannot be enhanced, and as a result, it can happen that the impact resistance is not improved. In this case, if the thermoplastic resin has functional groups such as epoxy groups, carboxyl groups, hydroxyl groups, or amino groups, etc. capable of reacting with epoxy resins or hardening agent, the inter-phase adhesiveness can be preferably improved to provide an effect of improving the breaking elongation of the cured product. It is also preferable for improving the adhesiveness, to contain a compatibilizer with affinity to both the epoxy resin composition and the thermoplastic resin. The compatibilizer can be preferably a phenoxy resin represented by the following formula (19) disclosed in Japanese Patent Laid-open No. 2-202913.

Formula (19)

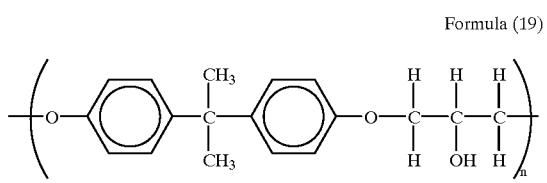

where n represents a numeral of 50 to 150.

Also a material identical in skeleton with, but smaller in molecular weight (preferably in an oligomer range) than, the thermoplastic resin used and with reactive functional groups at the ends can be preferably used, since it functions as a compatibilizer.

When the thermoplastic resin (C) is mixed with the epoxy resin composition, it can be dissolved into the epoxy resin composition beforehand, or can be dispersed as a powder in the epoxy resin composition, to be dissolved at the curing process. The reinforcing fibers of the prepreg of the present invention are fibers good in heat resistance and tensile strength used generally for advanced composite materials, and include, for example, carbon fibers, graphite fibers, aramid fibers, silicon carbide fibers, alumina fibers, boron fibers, tungsten carbide fibers, glass fibers, etc. Among them, carbon fibers and graphite fibers are more preferable in the present invention since they are good in specific strength and specific elastic modulus and capable of greatly contributing to the reduction of weight. All kinds of carbon fibers and graphite fibers can be used for respective applications, but high strength and high elongation carbon fibers of 4.4 GPa in tensile strength and 1.7% or more in tensile elongation are most suitable.

The cross-section of carbon fibers is not especially limited to conventional circular cross-section. However, noncircular cross-section such as triangle, square, hollow type, multifoliate type, and H type as disclosed in Japanese Patent Laid-Open Nos. 4-202815, 3-185121 and 3-97917 can be preferably used since such carbon fibers are less likely to be buckled than circular cross-section carbon fibers, and since the fiber reinforced composite material obtained can be improved in compressive properties. Among such noncircular cross-section carbon fibers, those which can be preferably used have a three- to five-foliated sectional form as each single filament, in which each of the foliage is swollen intermediately between its root and its tip, to form a section substantially consisting of a plurality of circles. Furthermore, it is preferable because of a large effect to prevent buckling, that the degree of deformation defined by a ratio, R/r is 1.5 to 3, where R is the radius of the circumscribed circle of the cross-section of the fiber and r is the radius of inscribed circle thereof.

The arrangement of the reinforcing fibers is not especially limited, and can be filaments paralleled in one direction, tow, woven fabric, mat, knitted fabric, braid, etc. Especially for an application requiring high strength and high elastic modulus, reinforcing fibers paralleled in one direction is most suitable, but a woven fabric easy to handle is also suitable for the present invention.

The percentage of water absorption in the first version of the present invention, etc. refers to the percentage of water absorption measured after the cured prepreg has been immersed in 71° C. water for 2 weeks. Absorbed water causes the matrix resin to be plasticized, and the decline of the elastic modulus at high temperature becomes large compared to that of the dry matrix resin. So, to keep high physical properties even at high temperature and high humidity, the percentage of water absorption preferably decrease. If the percentage of water absorption is 1% or less, the decline of physical properties at high temperature and high humidity is small. The percentage is preferably 0.9% or less, more preferably 0.85% or less.

The production of the prepreg is not especially limited, and any ordinary prepreg production process can be applied. When a composite material produced by laminating prepreg sheets is used as a structural material, the compressive strength after impact is an important physical property. It can happen that the drop of a tool or collision with a stone gives an impact to the structural material, causing interlayer delamination, thereby decreasing the compressive strength. If this is remarkable, the structural material cannot be practically used.

In general, to enhance the compressive strength after impact, it is known that it is effective to let a highly tough material exist near one side or both sides of each prepreg sheet, for distributing the tough material at interlayer zone of composite material laminated and cured the prepreg. As the tough material, it is known to use, for example, a thermoplastic resin as disclosed in Japanese Patent Laid-Open No. 63-162732, or an elastomer as disclosed in Japanese Patent Laid-Open No. 4-268361, or a elastomer modified thermosetting resin as disclosed in U.S. Pat. No. 3,472,730. If such an elastomer or elastomer modified thermosetting resin is used for interlayer toughening material, impact resistance is enhanced but the compressive property at high temperature is much decreased. So, the applicable range is limited. On the other hand, the specific prepreg of the present invention holds a good compressive strength even at high temperature and high humidity while exhibiting an unexpectedly high compressive strength after impact since such a thermoplastic resin is used for interlayer toughening material.

In this case, it is preferable for effectively enhancing the compressive strength after impact, that 90 wt % or more of the thermoplastic resin (D) is localized in an area from the surface of the prepreg to a depth of 15% in the thickness of the prepreg. The thermoplastic resin (D) which is arranged to exist on one side or both sides of the prepreg is preferably a polyamide, polyimide, polyether imide, polyamidimide, polysulfone, or polyether sulfone, etc. Among them, a polyamide is especially preferable since it is excellent in toughness and adhesiveness to the matrix resin. A polyamide modified by an epoxy resin can also be used as disclosed in Japanese Patent Laid-Open No. 1-104624.

The shape of the thermoplastic resin (D) can be various, for example, can be a film, particles, fibers, or a combination of at least two shape of the foregoing. In the case of a film, if the prepreg surface is perfectly covered as described in U.S. Pat. No. 4,604,319, the surface tackiness is lost, but the surface tackiness can be kept by forming through-holes in the film as described in Japanese Patent Laid-Open No. 63-97635, or by using a porous film as described in Japanese Patent Laid-Open No. 5-138785, or arranging film tapes as described in Japanese Patent Laid-Open No. 5-287091, or arranging flakes obtained by finely cutting the film as described in Japanese Patent Laid-Open No. 2-67333, etc.

The thermoplastic resin (D) used as fibers is preferable since the tackiness and drapability of the prepreg are excellent. In this case, the fibers are not limited in fiber length or arrangement. The fibers can be flocks obtained by finely cutting fibers as described in Japanese Patent Laid-Open No. 2-67333, short fibers as described in Japanese Patent Laid-Open No. 2-69566, parallel-arranged filaments as described in Japanese Patent Laid-Open No. 4-292634, a woven fabric as described in Japanese Patent Laid-Open No. 2-32843, or a nonwoven fabric or knitted fabric as described in International Laid-Open No. 94016003. Among them, fibers used as a nonwoven fabric or knitted fabric are preferable since tackiness and drapability are more excellent.

When the thermoplastic resin (d) is partiles, the particles can be spherical particles as described in Japanese Patent Laid-Open No. 1-110537, or non-spherical particles as described in Japanese Patent Laid-Open No. 1-110536, or porous particles as described in Japanese Patent Laid-Open No. 5-1159.

The above film, fibers or particles can be used alone, or they can be used in combination like a film containing fibers or particles, or a mixture of particles and fibers.

If the thermoplastic resin (D) is thermoplastic particle consists of an epoxy resin or bismaleimide resin and thermoplastic resin which have semi-IPN structures or which are capable of forming semi-IPN structure, it is preferable for keeping the solvent resistance of the composite material as a whole, since the particles themselves are excellent in solvent resistance. The term "IPN" is an abbreviation of interpenetrating polymer network, which means a structure in which cross-linked polymers of different types penetrate each other to form a network. The term "semi-IPN" means a structure in which a cross-linked polymer and a linear polymer penetrate each other to form a network. The formation of semi-IPN can be achieved by using any conventional method, for example by dissolving a thermoplastic resin and a thermosetting resin into a common solvent, for homogeneous mixing, and re-precipitating. If the thermoplastic resin (D) is particles of an epoxy resin and a polyamide formed as semi-IPN, it is preferable for giving high heat resistance and high impact resistance to the prepreg.

Such a thermoplastic resin can be arranged to exist near the surface of a prepreg by simply sticking or scattering the thermoplastic resin onto one side or both sides of a prepreg produced according to an ordinary method, or sticking a film in which the thermoplastic resin is impregnated with the matrix resin or a film in which the thermoplastic resin is dispersed in the matrix resin, onto one side or both sides of a prepreg produced according to an ordinary method.

When a film with the thermoplastic resin dispersed is stuck, it is preferable that the thermoplastic resin (D) is particles of 30 μm or less in median particle diameter, since the the coater rolls are not blocked by the particles when the film is coated. Said prepreg provides a composite material excellent in impact resistance and in the compressive strength at high temperature and high humidity. If a rectangular notched specimen of 305 mm in 0° direction and 38 mm in 90° direction with a circular hole of 6.35 mm in diameter at the center prepared by quasi-isotropically laminating 16 prepreg sheets and curing at 180° C. at a pressure of 0.588 MPa for 2 hours has a compressive strength of 275 MPa or more at high temperature and high humidity (measured at 82° C. after immersing it in 71° C. water for 2 weeks), it is very excellent in the compressive strength at high temperature and high humidity, and can preferably satisfy the high compressive strength required in larger structures.

If a rectangular coupon of 152.4 mm in 0° direction and 101.6 mm in 90° direction cut out of a board prepared by quasi-isotropically laminating 24 prepreg sheets and curing at 180° C. at a pressure of 0.588 MPa for 2 hours has a compressive strength of 275 MPa or more after having been given a drop impact of 30.5 N·m at the center it is preferable since it is very excellent in impact resistance.

The fiber reinforced composite material produced with said prepreg cured is excellent in impact resistance and in the compressive strength at high temperature and high humidity, and since it has high damage tolerance and satisfies the high compressive strength required for larger structures, it expands the degree of freedom in structural design and gives a composite material light in weight and high in performance preferably.

EXAMPLES

The present invention is described below in more detail in reference to examples.

The measurement of the percentage of water absorption of a composite material, the measurement of the compressive strength of a notched coupon, and the measurement of the residual compressive strength after impact were conducted as described below.

A. Measurement of Percentage of Water Absorption

A composite material panel was prepared by quasi-isotropically laminating 16 prepreg sheets [(+45/0/–45/90) 2s] and curing at 180° C. at a pressure of 0.588 MPa in an autoclave for 2 hours. From the composite material panel, a rectangular coupon of 304.8 mm in 0° direction and 38.1 mm in 90° direction was cut out and had a circular hole of 6.35 mm in diameter drilled at the center, to make a circular notched coupon as a test specimen. The notched coupon was dried at 120° C. for 24 hours, and the dry weight was measured. In succession, it was immersed in 71° C. water for 2 weeks, and the weight of the board with water absorbed was measured. From the weights measured before and after water absorption, the weight increase rate by water absorption was calculated.

B. Measurement of Compressive Strength of Perforated Board

The notched coupon prepared in the above A was tested by an Instron Model 1128 testing machine, to measure the compressive strengths under the following conditions:

Dry sample at room temperature (25° C.)

Water absorbed sample obtained in the above A at a high temperature (82° C.)

C. Measurement of Residual Compressive Strength After Impact 24 prepreg sheets were laminated quasi-isotropically [+45/0/–45/90)3s] and cured at 180° C. at a pressure of 0.588 MPa in an autoclave for 2 hours, to obtain a composite material panel.

From the composite material board, a rectangular coupon of 152.4 mm in 0° direction and 101.6 mm in 90° direction was cut out as a test piece. A drop impact of 30.5 N·m was given at the center of the test piece, and then the compressive strength was measured using an Instron Model 1128 testing machine.

Example 1

(A) Production of Resin Compositions

The following raw materials were kneaded to obtain a first resin composition.

Tetraglycidyldiaminodiphenylmethane (A1) (ELM434, produced by Sumitomo Chemical Co., Ltd.) 90.0 parts by weight Bisphenol A type epoxy resin (epoxy equivalent weight 175) (a1) (Epikote 825, produced by Yuka Shell Epoxy K.K.) 10.0 parts by weight Polyether sulfone (C1) (PES5003P, produced by Mitsui Toatsu Chemicals, Inc.) 12.7 parts by weight 3,3'-diaminodiphenylsulfone (Bl) (produced by Wakayama Seika Kogyo Co., Ltd.) 35.0 parts by weight Furthermore, the following raw materials were kneaded to obtain a second resin composition.

Tetraglycidyldiaminodiphenylmethane (A1) (ELM434, produced by Sumitomo Chemical Co., Ltd.) 90.0 parts by weight Bisphenol A type epoxy resin (epoxy equivalent weight 175) (a1) (Epikote 825, produced by Yuka Shell Epoxy K.K.) 10.0 parts by weight Polyether sulfone (C1) (PES5003P, produced by Mitsui Toatsu Chemicals, Inc.) 4.3 parts by weight 3,3'-diaminodiphenylsulfone (B1l) (produced by Wakayama Seika Kogyo Co., Ltd.) 35.0 parts by weight Epoxy modified nylon particles (D1) 35.2 parts by weight The 3,3'-diaminodiphenylsulfone was ground using an impact grinder containing an air classifier (ACM-10 produced by Hosokawa Micron Cprporation) into powder of 11 $\mu$m in median particle diameter, which contained 90 wt % of powder of 22 $\mu$m or less in particle diameter, and almost 0% of powder of 1 $\mu$m or less in particle diameter, and were 1.83 in $\sigma$g. In this composition, the mole number of 3,3'-diaminodiphenylsulfone was 0.175 time the mole number of epoxy groups.

Of the raw materials of the second resin, the epoxy modified nylon resin was semi-IPN particles of 16 $\mu$m in mean particle diameter consisting of amorphous transparent nylon (Glylamide TR-55 produced by Mitsubishi Chemical Corp.), bisphenol A type epoxy resin, and polyamide based epoxy hardening agent, stated in Example 1 of Japanese Patent Laid-Open No. 1-104624.

(B) Production of Prepreg

The first resin prepared in the above (A) was coated on releasing paper with a weight of 31.2 g/m2 using a reverse roll coater, to prepare a first resin film. Then, the second resin was coated with a weight of 20.5 g/m2, to prepare a second resin film. Carbon fibers (T800H produced by Toray Industries, Inc.) of 294 GPa in elastic modulus and 1.9% in elongation paralleled in one direction were kept between said first resin films, and heated and pressed, to be impregnated with the resin. Furthermore, said second resin films were stuck onto both the sides of the resin impregnated carbon fibers, to obtain a prepreg of 190 g/m2 in areal weight of carbon fibers and 64.8% in carbon fiber content.

(C) Production of Cured Panel

Sheets of the prepreg produced in (B) were laminated in (+45/0/−45/90)2s and (+45/0/−45/90)3s, and they were cured at 180° C. at a pressure of 0.588 MPa in an autoclave for 2 hours.

(D) Measurement of Percentage of Water Absorption and Compressive Strengths

Both the compressive strength of the notched coupon at high temperature and high humidity and the compressive strength after impact were high, as shown below.

Percentage of water absorbability: 0.85%

Compressive strength of notched coupon

At room temperature: 325 MPa

At high temperature and high humidity: 278 MPa

Compressive strength after impact: 305 MPa

Example 2

(A) Production of Resin Compositions

The following raw materials were kneaded to obtain a first resin composition.

Tetraglycidyldiaminodiphenylmethane (A1) (ELM434, produced by Sumitomo Chemical Co., Ltd.) 60.0 parts by weight Tris(4-glycidyloxyphenyl)methane (A3) (TACTIX742, produced by Dow Chemical Japan Ltd.) 20.0 parts by weight Resorcinol diglycidyl ether (a3) (Denacol EX-201, produced by Nagase Chemicals Ltd.) 20.0 parts by weight Polyether sulfone (C1) (PES5003P, produced by Mitsui Toatsu Chemicals, Inc.) 12.6 parts by weight 3,3-diaminodiphenylsulf ) (produced by Wa kayama Seika Kogyo Co., Ltd.) 34.0 parts by weight Furthermore, the following raw materials were kneaded to obtain a second resin composition.

Tetraglycidyldiaminodiphenylmethane (A1) (ELM434, produced by Sumitomo Chemical Co., Ltd.) 60.0 parts Tris(4-glycidyloxyphenyl)methane (A3) (TACTIX742, produced by Dow Chemical Japan Ltd.) 20.0 parts by weight Resorcinol diglycidyl ether (a3) (Denacol EX-201, produced by Nagase Chemicals Ltd.) 20.0 parts by weight Polyether sulfone (C1) (PES5003P, produced by Mitsui Toatsu Chemicals, Inc.) 4.3 parts by weight 3,3'-diaminodiphenylsulfone (B1) (produced by Wakayama Seika Kogyo Co., Ltd.) 34.0 parts by weight Epoxy modified nylon particles (D1) 35.0 parts by weight The 3,3'-diaminodiphenylsulfone used wa s the same as that of Example 1. In this composition, the mole number of 3,3'-diaminodiphenylsulfone was 0.175 time the mole number of epoxy groups.

Of the raw materials of the second resin, the epoxy modified nylon particles used were the same as those of Example 1.

(B) Measurement of Percentage of Water Absorption and Compressive Strengths

The percentage of water absorption and compressive strengths were measured as described in Example 1, except that the resins prepared in the above (A) were used. Both the compressive strength of the notched coupon at high temperature and high humidity and the compressive strength after impact were high, as shown below.

Percentage of water absorption: 0.88%

Compressive strength of notched coupon

At room temperature: 331 MPa

At high temperature and high humidity: 269 MPa

Compressive strength after impact: 314 MPa

Example 3

(A) Production of Resin Compositions

The following raw materials were kneaded to obtain a first resin composition.

Tetraglycidyldiaminodiphenylmethane (A1) (ELM434, produced by Sumitomo Chemical Co., Ltd.) 80.0 parts by weight 1,6-diglycidyloxynaphthalene (A2) (HP4032, produced by Dainippon Ink and Chemicals, Inc.) 10.0 parts by weight Resorcinol diglycidyl ether (a3) (Denacol EX-201, produced by Nagase Chemicals Ltd.) 10.0 parts by weight Polyether imide (C2) (ULTEM1000, produced by GE Plastics Japan Ltd.) 12.7 parts by weight 3.3'-diaminodiphenylsulfone (B1) (produced by Wakayama Seika Kogyo Co., Ltd.) 34.5 parts by weight Furthermore, the following raw materials were kneaded to obtain a second resin composition.

Tetraglycidyldiaminodiphenylmethane (A1) (ELM434, produced by Sumitomo Chemical Co., Ltd.) 80.0 parts by weight 1,6-diglycidyloxynaphthalene (A2) (HP4032, produced by Dainippon Ink and Chemicals, Ind.) 10.0 parts by weight Resorcinol diglycidyl ether (a3) (Denacol EX-201, produced by Nagase Chemicals Ltd.) 10.0 parts by weight Polyether imide (C2) (ULTEM1000, produced by GE Plastics Japan Ltd.) 4.3 parts by weight 3,3'-diaminodiphenylsulfone (B1) (produced by Wakayama Seika Kogyo Co., Ltd.) 34.5 parts by weight
Epoxy modified nylon particles (D1) 34.5 parts by weight The 3,3'-diaminodiphenylsulfone used was the same as that used in Example 1. In this composition, the mole number of 3,3'-diaminodiphenylsulfone was 0.175 time the mole number of epoxy groups.

Of the raw materials of the second resin, the epoxy modified nylon particles used were the same as those used in Example 1.

(B) Measurement of Compressive Strengths

The percentage of water absorption and compressive strengths were measured as described in Example 1, except that the resins prepared in the above (A) were used. Both the compressive strength of the notched coupon at high temperature and high humidity, and the compressive strength after impact were high, as shown below.

Percentage of water absorption: 0.85%
Compressive strength of notched coupon
   At room temperature: 321 MPa
   At high temperature and high humidity: 281 MPa
Compressive strength after impact: 316 MPa

Example 4

(A) Production of Resin Compositions

The following raw materials were kneaded to prepare a first resin composition.

Tetraglycidyldiaminodiphenylmethane (A1) (ELM434, produced by Sumitomo Chemical Co., Ltd.) 30.0 parts by weight
1,6-diglycidyloxynaphthalene (A2) (HP4032, produced by Dainippon Ink and Chemicals, Inc.) 60.0 parts by weight
Resorcinol diglycidyl ether (a3) (Denacol EX-201, produced by Nagase Chemicals Ltd.) 10.0 parts by weight
Polyether imide (C2) (ULTEM1000, produced by GE Plastics Japan Ltd.) 12.7 parts by weight
3,3'-diaminodiphenylsulfone (B1) (produced by Wakayama Seika Kogyo Co., Ltd.) 31.6 parts by weight Furthermore, the following raw materials were kneaded to obtain a second resin composition.

Tetraglycidyldiaminodiphenylmethane (A1) (ELM434, produced by Sumitomo Chemical Co., Ltd.) 30.0 parts by weight
1,6-diglycidyloxynaphthalene (A2) (HP4032, produced by Dainippon Ink and Chemicals, Inc.) 60.0 parts by weight
Resorcinol diglycidyl ether (a3) (Denacol EX-201, produced by Nagase Chemicals Ltd.) 10.0 parts by weight
Polyether imide (C2) (ULTEM1000, produced by GE Plastics Japan Ltd.) 4.3 parts by weight
3,3'-diaminodiphenylsulfone (B1) (produced by Wakayama Seika Kogyo Co., Ltd.) 31.6 parts by weight
Epoxy modified nylon particles (D1) 34.3 parts by weight The 3,3'-diaminodiphenylsulfone used was the same as that used in Example 1. In this composition, the mole number of 3,3'-diaminodiphenylsulfone was 0.175 time the mole number of epoxy groups.

Of the raw materials of the second resin, the epoxy modified nylon particles used were the same as those used in Example 1.

(B) Measurement of Compressive Strengths

The percentage of water absorption and compressive strengths were measured as described in Example 1, except that the resins prepared in the above (A) were used. Both the compressive strength of the notched coupon at high temperature and high humidity and the compressive strength after impact were high, as shown below.

Percentage of water absorption: 0.83%
Compressive strength of notched coupon
   At room temperature: 307 MPa
   At high temperature and high humidity: 270 MPa
Compressive strength after impact: 328 MPa

Example 5

(A) Production of Resin Compositions

The following raw materials were kneaded to prepare a first resin composition.

1,6-diglycidyloxynaphthalene (A2) (HP4032, produced by Dainippon Ink and Chemicals, Inc.) 90.0 parts by weight
Resorcinol diglycidyl ether (a3) (Denacol EX-201, produced by Nagase Chemicals Ltd.) 10.0 parts by weight
Polyether imide (C2) (ULTEM1000, produced by GE Plastics Japan Ltd.) 12.2 parts by weight
3,3'-diaminodiphenylsulfone (B1) (produced by Wakayama Seika Kogyo Co., Ltd.) 29.5 parts by weight Furthermore, the following raw materials were kneaded to obtain a second resin composition.

1,6-diglycidyloxynaphthalene (A2) (HP4032, produced by Dainippon Ink and Chemicals, Inc.) 90.0 parts by weight
Resorcinol diglycidyl ether (a3) (Denacol EX-201, produced by Nagase Chemicals Ltd.) 10.0 parts by weight
Polyether imide (C2) (ULTEM1000, produced by GE Plastics Japan Ltd.) 4.3 parts by weight
3,3'-diaminodiphenylsulfone (B1) (produced by Wakayama Seika Kogyo Co., Ltd.) 29.5 parts by weight
Epoxy modified nylon particles (D1) 33.8 parts by weight The 3,3'-diaminodiphenylsulfone used was the same as that used in Example 1. In this composition, the mole number of 3,3'-diaminodiphenylsulfone was 0.175 time the mole number of epoxy groups.

Of the raw materials of the second resin, the epoxy modified nylon particles used were the same as those used in Example 1.

(B) Measurement of Compressive Strengths

The percentage of water absorption and compressive strengths were measured as described in Example 1, except that the resins prepared in the above (A) were used. Both the compressive strength of the notched coupon at high temperature and humidity, and the compressive strength after impact were high, as shown below.

Percentage of water absorption: 0.83%
Compressive strength of notched coupon
   At room temperature: 305 MPa
   At high temperature and high humidity: 272 MPa
Compressive strength after impact: 331 MPa

Example 6

(A) Production of Resin Compositions

The following raw materials were kneaded to obtain a first resin composition.

Tetraglycidyldiaminodiphenylmethane (A1) (ELM434, produced by Sumitomo Chemical Co., Ltd.) 90.0 parts by weight
Bisphenol A type epoxy resin (epoxy equivalent weight 175) (a1) (Epikote 825, produced by Yuka Shell Epoxy K.K.) 10.0 parts by weight
Polyether sulfone (C1) (PES5003P, produced by Mitsui Toatsu Chemicals, Inc.) 12.7 parts by weight
3,3'-diaminodiphenylsulfone (B1) (produced by Wakayama Seika Kogyo Co., Ltd.) 35.0 parts by weight Furthermore, the following raw materials were kneaded to obtain a second resin composition.

Tetraglycidyldiaminodiphenylmethane (A1) (ELM434, produced by Sumitomo K.K.) 90.0 parts by weight
Bisphenol A type epoxy resin (epoxy equivalent weight 175) (a1) (Epikote 825, produced by Yuka Shell Epoxy K.K.) 10.0 parts by weight Polyether sulfone (C1) (PES5003P, produced by Mitsui Toatsu Chemicals, Inc.) 4.3 parts by weight 3,3'-diaminodiphenylsulfone (B1) (produced by Wakayama Seika Kogyo Co., Ltd.) 35.0 parts by weight Epoxy modified nylon particles(D1) 35.2 parts by weight The 3,3'-diaminodiphenylsulfone used was the same as that used in Example 1. In this composition, the mole number of 3,3'-diaminodiphenylsulfone was 0.175 time the mole number of epoxy groups.

Of the raw materials of the second resin, the epoxy modified nylon particles used were the same as those used in Example 1.

(B) Measurement of Compressive Strengths

The percentage of water absorption and compressive strengths were measured as described in Example 1, except that the resins prepared in the above (A) were used, and that carbon fibers of 294 GPa in elastic modulus, 1.9% in elongation and 2.6 in degree of deformation R/r with its production method disclosed in Japanese Patent Laid-Open No. 4-202815 were used. Both the compressive strength of the notched coupon at high temperature and high humidity, and the compressive strength after impact were high, as shown below.

Percentage of water absorption: 0.81%

Compressive strength of notched coupon

At room temperature: 332 MPa

At high temperature and high humidity: 292 MPa

Compressive strength after impact: 338 MPa

Example 7

(A) Production of Resin Compositions

The following raw materials were kneaded to obtain a first resin composition.

Tetraglycidyldiaminodiphenylmethane (A1) (ELM434, produced by Sumitomo Chemical Co., Ltd.) 90.0 parts by weight Bisphenyl A type epoxy resin (epoxy equivalent weight 175) (a1) (Epikote 825, produced by Yuka Shell Epoxy K.K.) 10.0 parts by weight Polysulfone (C3) (UDEL P1700, produced by Nissan Chemical Industries, Ltd.) 12.7 parts by weight 3,3'-diaminodiphenylsulfone (B1) (produced by Wakayama Seika Kogyo Co., Ltd.) 35.0 parts by weight Furthermore, the following raw materials were kneaded to obtain a second resin composition.

Tetraglycidyldiaminodiphenylmethane (A1) (ELM434, produced by Sumitomo Chemical Co., Ltd.) 90.0 parts by weight Bisphenol A type epoxy resin (epoxy equivalent weight 175) (a1) (Epikote 825, produced by Yuka Shell Epoxy K.K.) 10.0 parts by weight Polysulfone (C3) (UDEL P1700, produced by Nissan Chemical Industries, Ltd.) 4.3 parts by weight 3,3'-diaminodiphenylsulfone (B1) (produced by Wakayama Seika Kogyo Co., Ltd.) 35.0 parts by weight Epoxy modified nylon particles (D1) 35.2 parts by weight The 3,3'-diaminodiphenylsulfone used was the same as that used in Example 1. In this composition, the mole number of 3,3'-diaminodiphenylsulfone was 0.175 time the mole number of epoxy groups.

Of the raw materials of the second resin, the epoxy modified nylon particles used were the same as those used in Example 1.

(B) Measurement of Compressive Strengths

The percentage of water absorption and compressive strengths were measured as described in Example 1, except that the resins prepared in the above (A) were used. The compressive strength of the notched coupon at high temperature and high humidity was somewhat lower since the thermoplastic resin used was rather lower in Tg than those of other examples, but it still was high, while the compressive strength after impact was also high, as shown below.

Percentage of water absorption: 0.85%

Compressive strength of notched coupon

At room temperature: 327 MPa

At high temperature and high humidity: 265 MPa

Compressive strength after impact: 320 MPa

Comparative Example 1

(A) Production of Resin Compositions

The following raw materials were kneaded to obtain a first resin composition.

The following raw materials were kneaded to obtain a first resin composition.

Tetraglycidyldiaminodiphenylmethane (A1) (ELM434, produced by Sumitomo Chemical Co., Ltd.) 90.0 parts by weight Bisphenyl F type epoxy resin (epoxy equivalent weight 172) (a2) (Epichlon 830, produced by Dainippon Ink and Chemicals, Inc.) 10.0 parts by weight Polyether sulfone (C1) (PES5003P, produced by Mitsui Toatsu Chemicals, Inc.) 12.7 parts by weight 4,4'-diaminodiphenylsulfone (b1) (Sumicure S, produced by Sumitomo Chemical Co., Ltd.) 35.0 parts by weight Furthermore, the following raw materials were kneaded to obtain a second resin composition.

Tetraglycidyldiaminodiphenylmethane (A1) (ELM434, produced by Sumitomo Chemical Co., Ltd.) 90.0 parts by weight Bisphenol F type epoxy resin (epoxy equivalent weight 172) (a2) (Epichlon 830, produced by Dainippon Ink and Chemicals, Inc.) 10.0 parts by weight Polyether sulfone (C1) (PES5003P, produced by Mitsui Toatsu Chemicals, Inc.) 4.3 parts by weight 4,4'-diaminodiphenylsulfone (b1) (Sumicure S, produced by Sumitomo Chemical Co., Ltd.) 35.0 parts by weight Epoxy modified nylon particles (D1) 35.2 parts by weight In this composition, the mole number of 4,4'-diaminodiphenylsulfone was 0.175 time the mole number of epoxy groups.

Of the raw materials of the second resin, the epoxy modified nylon particles used was the same as that used in Example 1.

(B) Measurement of Compressive Strengths

The percentage of water absorption and compressive strengths were measured as described in Example 1, except that the resins prepared in the above (A) were used. The compressive strength after impact showed a high value because of the interlayer toughening, but the compressive strengths of the notched coupon were not sufficient as shown below, since the curing agent was not in conformity with the present invention.

Percentage of water absorption: 1.10%

Compressive strength of notched coupon

At room temperature: 294 MPa

At high temperature and humidity: 248 MPa

Compressive strength after impact: 308 MPa

Comparative Example 2

(A) Production of Resin Compositions

The following raw materials were kneaded to obtain a first resin composition.

Tetraglycidyldiaminodiphenylmethane (A1) (ELM434, produced by Sumitomo Chemical Co., Ltd.) 60.0 parts by weight Bisphenol F type epoxy resin (epoxy equivalent weight 172) (a2) (Epichlon 830, produced by Dainippon Ink and Chemicals, Inc.) 40.0 parts by weight Polyether sulfone (C1) (PES5003P, produced by Mitsui Toatsu Chemicals, Inc.) 12.7 parts by weight 3,3'-diaminodiphenylsulfone (B1) (produced by Wakayama Seika Kogyo Co., Ltd.) 31.8 parts by weight Furthermore, the following raw materials were kneaded to obtain a second resin composition.

Tetraglycidyldiaminodiphenylmethane (A1) (ELM434, produced by Sumitomo Chemical Co., Ltd.) 60.0 parts by weight Bisphenol F type epoxy resin (epoxy equivalent weight 172) (a2) (Epichlon 830, produced by Dainippon Ink and Chemicals, Inc.) 40.0 parts by weight Polyether sulfone (C1) (PES5003P, produced by Mitsui Toatsu Chemicals, Inc.) 4.3 parts by weight 3,3'-diaminodiphenylsulfone (B1) (produced by Wakayama Seika Kogyo Co., Ltd.) 31.8 parts by weight Epoxy modified nylon particle s (D1) 35.2 parts by weight In this composition, the mole number of 3,3'-diaminodiphenylsulfone was 0.175 time the mole number of epoxy groups.

Of the raw materials of the second resin, the epoxy modified nylon particles was the same as that used in Example 1.

(B) Measurement of Compressive Strengths

The percentage of water absorption and compressive strengths were measured as described in Example 1, except that the resins prepared in the above (A) were used. The compressive strength after impact showed a high value because of the interlayer toughening, but the compressive strengths of the notched coupon were not sufficient as shown below, since the resin compositions were not in conformity with the present invention.

Percentage of water absorption: 1.05%

Compressive strength of notched coupon

At room temperature: 290 MPa

At high temperature and humidity: 236 MPa

Compressive strength after impact: 312 MPa

Comparative Example 3

(A) Production of Resin Composition

Tetraglycidyldiaminodiphenylmethane (A1) (ELM434, produced by Sumitomo Chemical Co., Ltd.) 50.0 parts by weight Triglycidyl-m-aminophenol (a4) (ELM120, produced by Sumitomo Chemical Co., Ltd.) 50.0 parts by weight 3,3'-diaminodiphenylsulfone (B1) (produced by Wakayama Seika Kogyo Co., Ltd.) 36.5 parts by weight Polyether sulfone (C1) (PES5003P, produced by Mitsui Toatsu Chemicals, Inc.) 34.1 parts by weight In this composition, the mole number of 3,3'-diaminodiphenylsulfone was 0.175 time the mole number of epoxy groups, and PES accounted for 20 wt % of the total weight of the matrix.

(B) Production of Prepreg

The resin prepared in the above (A) was coated on releasing paper with a weight of 51.7 g/m2 using a reverse roll coater, to form a resin film.

Carbon fibers of 294 GPa in elastic modulus and 1.9% in elongation (T800H, produced by Toray Industries, Inc.) paralleled in one direction were kept between said resin films, and heated and pressed, to be impregnated with the resin, for obtaining a prepreg of 190 g/m2 in areal weight of carbon fibers and 64.8% in carbon fiber content.

(C) Measurement of Compressive Strengths

The percentage of water absorption and compressive strengths were measured as described in Example 1. The compressive strength after impact was not sufficient since interlayer toughening was not applied, and the compressive strength of the notched coupon at high temperature and high humidity was not sufficient either as shown below, since the resin composition was not in conformity with the present invention (since a tri-functional aminophenol type epoxy resin poor in heat and water resistance was contained in a large amount).

Percentage of water absorption: 1.15%

Compressive strength of notched coupon

At room temperature: 325 MPa

At high temperature and humidity: 221 MPa

Compressive strength after impact: 138 MPa

Comparative Example 4

(A) Production of Resin Composition

Tetraglycidyldiaminodiphenylmethane (A1) (ELM434, produced by Sumitomo Chemical Co., Ltd.) 30.0 parts by weight Bisphenol F type epoxy resin (epoxy equivalent weight 172) (a2) (Epichlon 830, produced by Dainippon Ink and Chemicals, Inc.) 20.0 parts by weight Triglycidyl-4-aminocresol (epoxy equivalent weight 107) (a5) (ELM100, produced by Sumitomo Chemical Co., Ltd.) 50.0 parts by weight 3,3'-diaminodiphenylsulfone (B1) (produced by Wakayama Seika Kogyo Co., Ltd.) 36.4 parts by weight Polyether imide (C2) (ULTEM1000, produced by GE Plastics Japan Ltd.) 34.1 parts by weight In this composition, the mole number of 3,3'-diaminodiphenylsulfone was 0.175 time the mole number of epoxy groups. The polyether imide accounted for 20 wt % of the total weight of the matrix.

(B) Production of Prepreg

The percentage of water absorption and compressive strengths were measured as described in Comparative Example 3, except that the resin prepared in the above (A) was used. The compressive strength after impact was not sufficient since the interlayer toughening was not applied, and the compressive strength of the notched coupon at high temperature and high humidity was not sufficient either as shown below, since the resin composition was not in conformity with the present invention (since a tri-functional aminophenol type epoxy resin poor in heat and water resistance was contained in a large amount).

Percentage of water absorption: 1.12%

Compressive strength of notched coupon

At room temperature: 310 MPa

At high temperature and humidity: 212 MPa

Compressive strength after impact: 159 MPa

Comparative Example 5

(A) Production of Resin Composition

Tetraglycidyldiaminodiphenylmethane (A1) (ELM434, produced by Sumitomo Chemical Co., Ltd.) 100.0 parts by weight Bis[4-(3-aminophenoxy)phenyl]sulfone (b2) (BAPS-M, produced by Wakayama Seika Kogyo Co., Ltd.) 63.1 parts by weight Polyether imide (C2) (ULTEM1000, produced by GE Plastics Japan Ltd.) 18.1 parts by weight In this composition, the mole number of 3,3'-diaminodiphenylsulfone was 0.175 time the mole number of epoxy groups, and the polyether imide accounted for 10 wt % of the total weight of the matrix.

(B) Production of Prepreg

The percentage of water absorption and compressive strengths were measured as described in Comparative Example 3, except that the resin prepared in the above (A) was used. Since the prepreg was too high in the viscosity of the resin, carbon fibers were insufficiently impregnated with the resin, and many voids existed in cross section of the composite panel, not allowing sufficient physical properties to be achieved, as shown below.

Percentage of water absorption: 1.11%
Compressive strength of notched coupon
 At room temperature: 208 MPa
 At high temperature and humidity: 121 MPa
Compressive strength after impact: 117 MPa Comparative Example 6
(A) Production of Resin Composition
Tetraglycidyldiaminodiphenylmethane (A1) (ELM434, produced by Sumitomo Chemical Co., Ltd.) 60.0 parts by weight
Triglycidyl-4-aminocresol (epoxy equivalent weight 107) (a5) (ELM100, produced by Sumitomo Chemical Co., Ltd.) 40.0 parts by weight
3,3'-diaminodiphenylsulfone (B1) (produced by Wakayama Seika Kogyo Co., Ltd.) 38.1 parts by weight
Polyether imide (C2) (ULTEM1000, produced by GE Plastics Japan Ltd.) 15.3 parts by weight In this composition, the mole number of 3,3'-diaminodiphenylsulfone was 0.175 time the mole number of epoxy groups, and the polyether imide accounted for 20 wt % of the total weight of the matrix.

(B) Production of Prepreg

The percentage of water absorption and compressive strengths were measured as described in Comparative Example 3, except that the resin prepared in the above (A) was used. The compressive strength after impact was not sufficient since the interlayer toughening was not applied, and the compressive strength of the notched coupon at high temperature and high humidity was not sufficient either as shown below, since the resin composition was not in conformity with the present invention (since a tri-functional aminophenol type epoxy resin poor in heat and water resistance was contained in a large amount).

Percentage of water absorption: 1.12%
Compressive strength of notched coupon
 At room temperature: 317 MPa
 At high temperature and humidity: 227 MPa
Compressive strength after impact: 145 MPa Comparative Example 7
(A) Production of Resin Composition
Bisphenol F type epoxy resin (epoxy equivalent weight 172) (a2) (Epichlon 830, produced by Dainippon Ink and Chemicals, Inc.) 50.0 parts by weight
Triglycidyl-4-aminocresol (epoxy equivalent weight 107) (a5) (ELM100, produced by Sumitomo Chemical Co., Ltd.) 50.0 parts by weight
3,3'-diaminodiphenylsulfone (B1) (produced by Wakayama Seika Kogyo Co., Ltd.) 33.1 parts by weight
Polyether sulfone (C1) (PES5003P, produced by Mitsui Toatsu Chemicals, Inc.) 42.3 parts by weight In this composition, the mole number of 3,3'-diaminodiphenylsulfone was 0.175 time the mole number of epoxy groups, and the polyether imide accounted for 24 wt % of the total weight of the matrix.

(B) Production of Prepreg

The percentage of water absorption and compressive strengths were measured as described in Comparative Example 3, except that the resin prepared in the above (A) was used. The compressive strength after impact was not sufficient since the interlayer toughening was not applied, and the compressive strength of the notched coupon at high temperature and high humidity was not sufficient either as shown below, since the resin composition was not in conformity with the present invention (since a tri-functional aminophenol type epoxy resin poor in heat and water resistance was contained in a large amount).

Percentage of water absorption: 1.12%
Compressive strength of notched coupon
 At room temperature: 264 MPa
 At high temperature and humidity: 194 MPa
Compressive strength after impact: 200 MPa

TABLE 1

| | | | | | Example | | | | | | |
|---|---|---|---|---|---|---|---|---|---|---|---|
| | | | | | 1 | 2 | 3 | 4 | 5 | 6 | 7 |
| First resin | | | | | | | | | | | |
| A | A1 | Tetraglycidyldiaminodip henylmethane | ELM434 Sumitomo Chemical Co., Ltd. | | 90.0 | 60.0 | 80.0 | 30.0 | — | 90.0 | 90.0 |
| | A2 | 1,6-diglycidyloxynaphthalene | HP4032 Dainippon Ink and Chemicals, Inc. | | — | — | 10.0 | 60.0 | 90.0 | — | — |
| | A3 | Tris(4-glycidyloxyphenyl)methane | TACTIX742 Dow Chemical Japan Ltd. | | — | 20.0 | — | — | — | — | — |
| | a1 | Bisphenol A type epoxy resin | EPC825 Yuka Shell Epoxy K.K. | | 10.0 | — | — | — | — | 10.0 | 10.0 |
| | a2 | Bisphenol F type epoxy resin | EPC830 Dainippon Ink and Chemicals, Inc. | | — | — | — | — | — | — | — |
| | a3 | Resorcinol diglycidyl ether | EX-201 Nagase Chemicals Ltd. | | — | 20.0 | 10.0 | 10.0 | 10.0 | — | — |
| | a4 | Triglycidyl-m-aminophenol | ELM120 Sumitomo Chemical Co., Ltd. | | — | — | — | — | — | — | — |
| | a5 | Triglycidyl-4-aminocresol | ELM100 Sumitomo Chemical Co., | | | | | | | | |

TABLE 1-continued

| | | | | | | | | | | | |
|---|---|---|---|---|---|---|---|---|---|---|---|
| | | | Ltd. | | | | | | | | |
| B | B1 | 3,3'-diaminodiphenylsulfone | 3,3'-DDS Wakayama Seika Kogyo Co., Ltd. | 35.0 | 34.0 | 34.5 | 31.6 | 29.5 | 35.0 | 35.0 | |
| | b1 | 4,4'-diaminodiphenylsulfone | 4,4'-DDS Sumitomo Chemical Ltd. | — | — | — | — | — | — | — | |
| | b2 | Bis[4-(3-aminophenoxy)phenyl]sulfone | BAPS-m Wakayama Seika Kogyo Co., Ltd. | — | — | — | — | — | — | — | |
| C | C1 | Polyether sulfone Tg: 225° C. | PES5003P Mitsui Toatsu Chemicals, Inc. | 12.7 | 12.6 | — | — | — | 12.7 | — | |
| | C2 | Polyether imide Tg: 217° C. | ULTEM GE Plastics Japan Ltd. | — | — | 12.7 | 12.7 | 12.2 | — | — | |
| | C3 | Polysulfone Tg: 195° C. | UDEL P1700 Nissan Chemical Industries, Ltd. | — | — | — | — | — | — | 12.7 | |
| Second resin | | | | | | | | | | | |
| A | A1 | | | 90.0 | 60.0 | 80.0 | 30.0 | — | 90.0 | 90.0 | |
| | A2 | | | — | — | 10.0 | 60.0 | 90.0 | — | — | |
| | A3 | | | — | 20.0 | — | — | — | — | — | |
| | a1 | | | 10.0 | — | — | — | — | 10.0 | 10.0 | |
| | a2 | | | — | — | — | — | — | — | — | |
| | a3 | | | — | 20.0 | 10.0 | 10.0 | 10.0 | — | — | |
| | a4 | | | — | — | — | — | — | — | — | |
| | a5 | | | — | — | — | — | — | — | — | |
| B | B1 | | | 35.0 | 34.0 | 34.5 | 31.6 | 29.5 | 35.0 | 35.0 | |
| | b1 | | | — | — | — | — | — | — | — | |
| | b2 | | | — | — | — | — | — | — | — | |
| C | C1 | | | 4.3 | 4.3 | — | — | — | 4.3 | — | |
| | C2 | | | — | — | 4.3 | 4.3 | 4.3 | — | — | |
| | C3 | | | — | — | — | — | — | — | 4.3 | |
| D | | Epoxy modified nylon grains | | 35.2 | 35.0 | 34.5 | 34.3 | 33.8 | 35.2 | 35.2 | |

(In parts by weight)

TABLE 2

| | | | | Comparative Example | | | | | | |
|---|---|---|---|---|---|---|---|---|---|---|
| | | | | 1 | 2 | 3 | 4 | 5 | 6 | 7 |
| First resin | | | | | | | | | | |
| A | A1 | Tetraglycidyldiaminodiphenylmethane | ELM434 Sumitomo Chemical Co., Ltd. | 90.0 | 60.0 | 50.0 | 30.0 | 100.0 | 60.0 | — |
| | A2 | 1,6-diglycidyloxynaphthalene | HP4032 Dainippon Ink and Chemicals, Inc. | — | — | — | — | — | — | — |
| | A3 | Tris(4-glycidyloxyphenyl)methane | TACTIX742 Dow Chemical Japan Ltd. | — | — | — | — | — | — | — |
| | a1 | Bisphenol A type epoxy resin | EPC825 Yuka Shell Epoxy K.K. | — | — | — | — | — | — | — |
| | a2 | Bisphenol F type epoxy resin | EPC830 Dainippon Ink and Chemicals, Inc. | 10.0 | 40.0 | — | 20.0 | — | — | 50.0 |
| | a3 | Resorcinol diglycidyl ether | EX-201 Nagase Chemicals Ltd. | — | — | — | — | — | — | — |
| | a4 | Triglycidyl-m-aminophenol | ELM120 Sumitomo Chemical Co., Ltd. | — | — | 50.0 | — | — | — | — |
| | a5 | Triglycidyl-4-aminocresol | ELM100 Sumitomo Chemical Co., Ltd. | — | — | — | 50.0 | — | 40.0 | 50.0 |
| B | B1 | 3,3'-diaminodiphenylsulfone | 3,3'-DDS Wakayama Seika Kogyo Co., Ltd. | — | 31.8 | 36.5 | 36.4 | 29.5 | 38.1 | 33.1 |
| | b1 | 4,4'-diaminodiphenylsulfone | 4,4'-DDS Sumitomo Chemical Co. Ltd. | 35.0 | — | — | — | — | — | — |
| | b2 | Bis[4-(3-aminophenoxy)phenyl]sul | BAPS-m Wakayama Seika Kogyo | — | — | — | — | 63.1 | — | — |

TABLE 2-continued

| | | | | | | | | | | | |
|---|---|---|---|---|---|---|---|---|---|---|---|
| | | fone | Co., Ltd. | | | | | | | | |
| C | C1 | Polyether sulfone Tg: 225° C. | PES5003P Mitsui Toatsu Chemicals, Inc. | 12.7 | 12.7 | 34.1 | — | — | — | 42.3 |
| | C2 | Polyether imide Tg: 217° C. | ULTEM GE Plastics Japan Ltd. | — | — | — | 34.1 | 18.1 | 15.3 | — |
| | C3 | Polysulfone Tg: 195° C. | UDEL P1700 Nissan Chemical Industries, Ltd. | — | — | — | — | — | — | — |
| Second resin | | | | | | | | | | | |
| A | A1 | | | 90.0 | 60.0 | — | — | — | — | 90.0 |
| | A2 | | | — | — | — | — | — | — | — |
| | A3 | | | — | — | — | — | — | — | — |
| | a1 | | | — | — | — | — | — | — | — |
| | a2 | | | 10.0 | 40.0 | — | — | — | — | — |
| | a3 | | | — | — | — | — | — | — | — |
| | a4 | | | — | — | — | — | — | — | — |
| | a5 | | | — | — | — | — | — | — | — |
| B | B1 | | | — | 31.8 | — | — | — | — | — |
| | b1 | | | 35.0 | — | — | — | — | — | — |
| | b2 | | | — | — | — | — | — | — | — |
| C | C1 | | | 4.3 | 4.3 | — | — | — | — | — |
| | C2 | | | — | — | — | — | — | — | — |
| | C3 | | | — | — | — | — | — | — | — |
| D | | Epoxy modified nylon grains | | 35.2 | 35.2 | — | — | — | — | — |

Comparative example

TABLE 3

| | | Example | | | | | | |
|---|---|---|---|---|---|---|---|---|
| | | 1 | 2 | 3 | 4 | 5 | 6 | 7 |
| Percentage of water absorption | | 0.85 | 0.88 | 0.85 | 0.83 | 0.83 | 0.81 | 0.85 |
| Compressive strength of perforated board (MPa) | Room temperature | 325 | 331 | 321 | 307 | 305 | 332 | 327 |
| | High temperature and high humidity | 278 | 269 | 281 | 270 | 272 | 292 | 265 |
| Residual compressive strength after impact (MPa) | | 305 | 314 | 316 | 328 | 331 | 338 | 320 |

TABLE 4

| | | Comparative Example | | | | | | |
|---|---|---|---|---|---|---|---|---|
| | | 1 | 2 | 3 | 4 | 5 | 6 | 7 |
| Percentage of water absorption | | 0.10 | 1.05 | 1.15 | 1.12 | 1.11 | 1.12 | 1.12 |
| Compressive strength of perforated board (MPa) | Room temperature | 294 | 290 | 325 | 310 | 208 | 317 | 264 |
| | High temperature and high humidity | 248 | 236 | 221 | 212 | 121 | 227 | 194 |
| Residual compressive strength after impact (MPa) | | 308 | 312 | 138 | 159 | 117 | 145 | 200 |

INDUSTRIAL APPLICABILITY

Since the prepreg of the present invention can provide a composite material with an excellent compressive property under hot/wet condition, sheets of the prepreg can be laminated and cured for processing into a fiber reinforced material to be used as a structural material, or can be wound around a mandrel for processing into poles, shafts, etc. to allow suitable use.

We claim:

1. A prepreg comprising reinforcing fibers and a matrix resin, said matrix resin comprising:

(a) an epoxy resin composition (A) of which 80 wt % or more is tetraglycidyldiaminodiphenylmethane,
(b) a diamine compound (B) having 1 to 3 phenyl groups in its skeleton, at least one of said phenyl groups having a bonded group at a meta position, said bonded group comprising an amino group wherein said diamine compound (B) is 3,3'-diaminodiphenylsulfone, and
(c) a film, particles, fibers or composites of said film, particles or fibers of a thermoplastic resin (D), wherein 90 wt % or more of the thermoplastic resin (D) is localized in an area from a surface of the prepreg to a depth from said surface of 15% of a thickness of the prepreg.

2. A prepreg according to claim 1, said matrix resin further comprising a thermoplastic resin (C) having a glass transition temperature of 180° C. or higher.

3. A prepreg according to claim 1, wherein the molar ratio of said diamine compound (B) to the epoxy groups in said epoxy resin composition (A) is from 0.15 to 0.2.

4. A prepreg according to claim 1, wherein 90 wt % or more of said 3,3'-diaminodiphenylsulfone is in the form of powder particles of 40 μm or less in particle diameter, 1 wt % or less of said powder particles being 1 μm or less in particle diameter.

5. A prepreg according to claim 1, wherein said 3,3'-diaminodiphenylsulfone is in the form of powder particles of 15 μm or less in median particle diameter and 2.0 or less in σg value calculated from the following equation: σg=[(Mean particle diameter+Standard deviation)/(Mean particle diameter)].

6. A prepreg according to claim 2, wherein the thermoplastic resin (C) is a resin selected from the group consisting of polysulfones, polyimides, polyketones and aromatic polyesters.

7. A prepreg according to claim 2, wherein the thermoplastic resin (C) is a polysulfone with ether bonds in the main chain.

8. A prepreg according to claim 2, wherein the thermoplastic resin (C) is a polyimide with ether bonds in the main chain.

9. A prepreg according to claim 2, wherein the thermoplastic resin (C) is present in an amount of 1 to 15 wt %, based on the weight of the epoxy resin composition (A).

10. A prepreg according to claim 2, wherein the thermoplastic resin (C) is soluble in the epoxy resin composition (A).

11. A prepreg according to claim 1, wherein the reinforcing fibers are fibers selected from the group consisting of carbon fibers, graphite fibers, boron fibers, tungsten carbide fibers and glass fibers.

12. A prepreg according to claim 11, wherein the carbon fibers are high strength and high elongation carbon fibers of 4.4 GPa or more in tensile strength and 1.7% or more in tensile elongation.

13. A prepreg according to claim 1, wherein the thermoplastic resin (D) is a resin selected from the group consisting of polyamides, polyimides, polysulfones, polyether sulfones, polyamidimides and polyether imides.

14. A prepreg according to claim 1, wherein the thermoplastic resin (D) in the prepreg is particles of 30 μm or less in median particle diameter.

15. A prepreg comprising reinforcing fibers and a matrix resin, said matrix resin comprising:
(a) an epoxy resin composition of which 80 wt % or more is tetraglycidyldiaminodiphenylmethane,
(b) a diamine compound (B) having 1 to 3 phenyl groups in its skeleton, at least one of said phenyl groups having a bonded group at a meta position, said bonded group comprising an amino group wherein said diamine compound (B) is 3,3'-diaminodiphenylsulfone, and
(c) a semi-interpenetrating polymer network comprising particles,
wherein 90 wt % or more of the particles are localized in an area from a surface of the prepreg to a depth from said surface of 15% of a thickness of the prepreg.

16. A prepreg according to claim 15, said matrix resin further comprising a thermoplastic resin (C) having a glass transition temperature of 180° C. or higher.

17. A prepreg according to claim 15, wherein the semi-interpenetrating polymer network comprises a thermosetting resin and a thermoplastic resin.

18. A prepreg according to claim 17, wherein the semi-interpenetrating polymer network comprises an epoxy resin or a bismaleimide resin and a polyamide.

19. A composite material obtained from the prepreg of claim 1, having a compressive strength of 275 MPa or more, said compressive strength being measured by a test carried out in the following manner:
(a) laminating 16 sheets of the prepreg to form a quasi-isotropic laminate;
(b) curing said quasi-isotropic laminate at 180° C. under a pressure of 0.588 MPa for 2 hours to produce a cured laminate;
(c) cutting said cured laminate to produce a rectangular coupon of 305 mm in 0° direction and 38 mm in 90° direction;
(d) drilling a hole of 6.35 mm at the center of said rectangular coupon to produce a notched rectangular coupon;
(e) drying said notched rectangular coupon at 120° C. for 24 hours to produce a dry sample;
(f) immersing said dry sample in 71° C. water for 2 weeks to produce a water absorbed sample; and
(g) measuring the compression strength of said water absorbed sample at 82° C.

20. A composite material obtained from the prepreg of claim 2, having a compressive strength of 275 MPa or more, said compressive strength being measured by a test carried out in the following manner:
(a) laminating 16 sheets of the prepreg to form a quasi-isotropic laminate;
(b) curing said quasi-isotropic laminate at 180° C. under a pressure of 0.588 MPa for 2 hours to produce a cured laminate;
(c) cutting said cured laminate to produce a rectangular coupon of 305 mm in 0° direction and 38 mm in 90° direction;
(d) drilling a hole of 6.35 mm at the center of said rectangular coupon to produce a notched rectangular coupon;
(e) drying said notched rectangular coupon at 120° C. for 24 hours to produce a dry sample;
(f) immersing said dry sample in 71° C. water for 2 weeks to produce a water absorbed sample; and
(g) measuring the compression strength of said water absorbed sample at 82° C.

21. A composite material obtained from the prepreg of claim 15, having a compressive strength of 275 MPa or more, said compressive strength being measured by a test carried out in the following manner:
(a) laminating 16 sheets of the prepreg to form a quasi-isotropic laminate;
(b) curing said quasi-isotropic laminate at 180° C. under a pressure of 0.588 MPa for 2 hours to produce a cured laminate;
(c) cutting said cured laminate to produce a rectangular coupon of 305 mm in 0° direction and 38 mm in 90° direction;
(d) drilling a hole of 6.35 mm at the center of said rectangular coupon to produce a notched rectangular coupon;
(e) drying said notched rectangular coupon at 120° C. for 24 hours to produce a dry sample;
(f) immersing said dry sample in 71° C. water for 2 weeks to produce a water absorbed sample; and (g) measuring the compression strength of said water absorbed sample at 82° C.

22. A composite material obtained from the prepreg of claim 1, having a residual-compressive-strength-after-impact of 275 MPa or more, said residual-compressive-strength-after-impact being measured by a test carried out in the following manner:

(a) laminating 24 sheets of the prepreg to form a quasi-isotropic laminate;

(b) curing said quasi-isotropic laminate at 180° C. under a pressure of 0.588 MPa for 2 hours to produce a cured laminate;

(c) cutting said cured laminate to produce a rectangular coupon of 152.4 mm in 0° direction and 101.6 mm in 90° direction;

(d) providing a drop impact of 30.5 N at the center of said rectangular coupon to produce an impacted test piece; and (e) measuring the residual-compressive-strength-after-impact of said impacted test piece.

23. A composite material obtained from the prepreg of claim 2, having a residual-compressive-strength-after-impact of 275 MPa or more, said residual-compressive-strength-after-impact being measured by a test carried out in the following manner:

(a) laminating 24 sheets of the prepreg to form a quasi-isotropic laminate;

(b) curing said quasi-isotropic laminate at 180° C. under a pressure of 0.588 MPa for 2 hours to produce a cured laminate;

(c) cutting said cured laminate to produce a rectangular coupon of 152.4 mm in 0° direction and 101.6 mm in 90° direction;

(d) providing a drop impact of 30.5 N at the center of said rectangular coupon to produce an impacted test piece; and (e) measuring the residual-compressive-strength-after-impact of said impacted test piece.

24. A composite material obtained from the prepreg of claim 15, having a residual-compressive-strength-after-impact of 275 MPa or more, said residual-compressive-strength-after-impact being measured by a test carried out in the following manner:

(a) laminating 24 sheets of the prepreg to form a quasi-isotropic laminate;

(b) curing said quasi-isotropic laminate at 180° C. under a pressure of 0.588 MPa for 2 hours to produce a cured laminate;

(c) cutting said cured laminate to produce a rectangular coupon of 152.4 mm in 0° direction and 101.6 mm in 90° direction;

(d) providing a drop impact of 30.5 N at the center of said rectangular coupon to produce an impacted test piece; and (e) measuring the residual-compressive-strength-after-impact of said impacted test piece.

25. A composite material obtained by curing a laminate of sheets of prepreg according to claim 1, 2, 15, or 16, having a percentage of water absorption of 1% or less following curing and immersion in 71° C. water for 2 weeks of said prepreg.

* * * * *